E. M. BENFIELD.
Hedge Trimmer.
No. 36,049. Patented July 29, 1862.
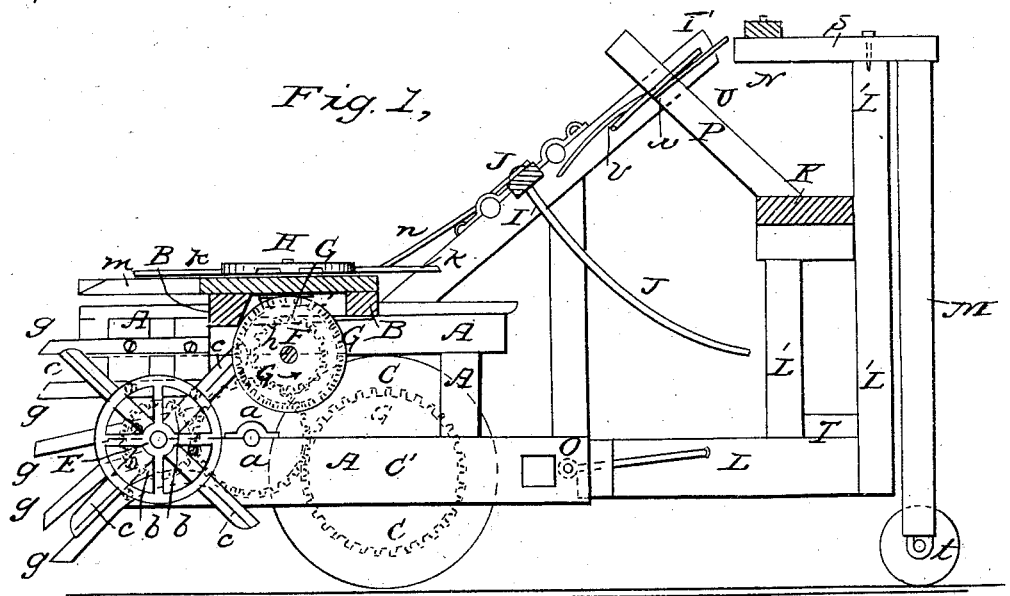

UNITED STATES PATENT OFFICE.

E. M. BENFIELD, OF MAQUON, ILLINOIS, ASSIGNOR TO BENFIELD & DAWDY, OF SAME PLACE.

IMPROVEMENT IN MACHINES FOR TRIMMING HEDGES.

Specification forming part of Letters Patent No. 36,049, dated July 29, 1862.

*To all whom it may concern:*

Be it known that I, E. M. BENFIELD, of Maquon, in the county of Knox and State of Illinois, have invented a new and Improved Machine for Trimming Hedges; and I do hereby declare that the following is a full, clear, and exact description of the same, reference being had to the annexed drawings, forming part of this specification, in which—

Figure 1 is a longitudinal section through the improved machine, taken in the vertical plane indicated by the red line $x\ x$, Fig. 2. Fig. 2 is a plan view of the improved machine complete.

Similar letters of reference indicate corresponding parts in both figures.

This invention is an improved machine for trimming hedges, which is to be drawn and operated by animals, and which will trim off the top and sides of a hedge with comparatively little expense of time and labor.

My invention consists in the arrangement, within a suitable frame-work, of a double series of stationary and rotary cutters in a vertical plane for trimming each side of the hedge, and in the arrangement of a horizontal series of fixed and rotary cutters over the side-trimming series for trimming the top of the hedge, in combination with a frame which is arranged behind the trimmers, and which is jointed to the front frame, and arranged and operated so as to raise and depress the trimming-cutters, and to guide the machine, all as will be hereinafter described.

To enable those skilled in the art to make and use my invention, I will proceed to describe its construction and operation.

A A are two rectangular frames, of a suitable width and length, made of strong timber, which are bolted securely together. These twin frames A A are connected by strong beams B B, which extend transversely across the top of each frame and keep the frames separated a suitable distance to admit the hedge between them, or so as to allow the frames to run on each side of the hedge, as will be hereinafter more fully explained. Each frame A is mounted on a wheel, C, the shaft C' of which has its bearings in each side of the frame, and the axis of one shaft C' of one frame A is in a line with the axis of the shaft C' of the opposite frame A. These wheels C C, on which the frames A A are respectively mounted, have side gearings, D D, which give rotary motion to the knife-shaft E E, through intermediate spur-wheels, $a\ a$, and pinions $b\ b$, which latter are keyed to the knife-shafts E E. All these transverse shafts have their bearings in the lower longitudinal bars of the frames, and they receive motion from their respective driving-wheels C C. The horizontal transverse knife-shafts E E are in the front part of their respective frames A, and their ends project out from the insides of the frames A A, and each one carries four long radial knives, $c\ c\ c\ c$, which rotate with their respective shafts. These knives $c\ c\ c\ c$ of each frame A have their cutting-edges beveled toward their frame, and the edges of these rotary knives cut against the edges of stationary knives $g\ g\ g\ g$, which are secured to the inside and the forward end of each frame A, and project out from this end a suitable distance and in suitable directions (in a vertical plane with their respective rotary knives) to gather and cut all the side branches of the hedge.

F is a horizontal transverse shaft, which extends across the machine and has its bearings in the upper longitudinal beams of both frames A A. This shaft carries a small pinion, $h$, on it, which engages with one of the spur-wheels D, and the shaft F is in this manner rotated when the machine is moved along. In the middle of the shaft F, between the two frames A, is keyed a bevel spur-wheel, G, which gives motion to a bevel pinion-wheel, G', on a short vertical shaft, H, which passes up through the flooring on beams B B, and carries four or more radial knives, $k\ k\ k\ k$, as shown clearly in Fig. 2. These knives $k$ rotate and perform their cutting against the edges of horizontal stationary knives $m\ m\ m\ m$, which project out in front of the beam B as far as the front of the machine, as shown in Figs. 1 and 2, and gather the top twigs and branches of the hedge, to be cut by the rotary knives $k\ k\ k\ k$ as they are drawn over the top of the hedge. The frames A A are both covered with boards, which keep the branches cut by the horizontal knives from becoming entangled in the gearing which the frames carry. On top of the frames A A, near their rear ends, and inclining back beyond the rear ends of these two frames A A, are two beams, I I', one of which, I', is extended above and beyond the other. These beams are securely supported and braced in the position described, and they are parallel to each other. These inclined beams or supports I I' serve as bearings for a horizontal transverse bar, J, from which projects downward and backward a fender, J', or a number of wire teeth, which prevent the branches that are cut by the rotary knives $k$ from being thrown by these knives against the driver, who sits on the transverse seat K, behind the frames A A.

$n$ is a spring, which is secured at its upper end to one end of the fender-bar J. The lower end of this spring rests on the top of one of the frames A and keeps the fender down on the top of the hedge.

Behind the frames A A, and pivoted to these frames by transverse rods at $o$ $o$, is a second frame-work, which consists of two longitudinal timbers, L L, from the rear ends of which project up perpendicularly two posts, L' L'. The seat K extends across the two front posts and serves as a cross brace or tie for the rear frame, and this seat is elevated above the horizontal plane of the top of the front frames, A A. The two hind posts L' L' extend above the seat K, and have short horizontal arms $s$ $s$ pivoted to their top ends, the rear ends of which arms are connected to perpendicular posts M M, which are pivoted to the hind posts, L' L', and on the lower end of these posts M are wheels $t$ $t$, which run on the ground and support the rear end of the rear frame. N is a horizontal transverse bar, which is pivoted at its ends to the front ends of the arms $s$ $s$.

P is an inclined arm which projects out in front of the seat K, and is attached to the beam I' by a spring-latch, $v$, and a long staple, $w$, in such a manner that by relieving the spring-latch $v$ the extreme end of beam I' may be raised or depressed, which operation raises or depresses the front end of the frames A A.

T T are two arms which project out from each side of the rear frame a suitable distance, and these arms each have a hook on their ends, to which the draft-chain of the team is attached for drawing the machine forward over the hedge.

The operation of my improved machine is as follows: Horses are attached to the arms T T, and the driver sits or stands on the seat K and guides the machine by moving bar N in a direction with its length, which changes the direction of the wheels $t$ $t$, on which the rear end of the rear frame is mounted.

The operation of trimming the hedge may be commenced at any desirable point along the line of hedge; but it will be found most convenient to start the machine at the commencement of the hedge. The machine is run astride of the hedge, the frames A A being on each side thereof, and the wheels C C of the frames A A give a rapid rotary motion to the knives $c$ $c$ $c$ $c$ when the machine is moved forward, and also to the horizontal knives $k$ $k$ $k$ $k$, through the medium of gear-wheels, which have been described, and as these knives rotate very rapidly the ends of the branches and twigs of the overgrowth of the hedge are clipped of along the sides of the hedge and on the top thereof. The driver, who sits or stands on the rear frame, can raise or depress the front ends of the frames A A by adjusting the inclined beam I' and securing it to the arm P by means of the spring-latch $v$, which is held into notches which are made in the arm P.

From this description it will be seen that as the machine is drawn along astride of the hedge the three series of knives $c$ $c$ and $k$ will trim the sides and top of the hedge. The fender $f$, which is attached to the bar J, will protect the driver from the branches flying from horizontal knives $k$ $k$, as before stated.

Having thus described my invention, what I claim as new, and desire to secure by Letters Patent, is—

1. Combining with the two frames A A, constructed as described, the rotary side cutters, $c$ $c$ $c$ $c$, and stationary cutters $g$ $g$ $g$ $g$, and the top or horizontal rotary cutters, $k$ $k$ $k$ $k$, and stationary cutters $m$ $m$ $m$ $m$, the rotary cutters being operated by the driving-wheels C C, through the medium of gear-wheels, as herein described.

2. Raising and depressing the front ends of of the frames A A by means of the inclined beam I', arm P, and spring-latch $v$, the arm P being secured to the rear frame, which is jointed to the frames A A at $o$ $o$, and which is mounted on guide-wheels $t$ $t$ at its rear end, substantially as herein described.

E. M. BENFIELD.

Witnesses:
   A. THURMAN,
   J. C. HOUSH.